United States Patent [19]

Amsler et al.

[11] 4,044,909
[45] Aug. 30, 1977

[54] TILE WALL COVER

[75] Inventors: David C. Amsler, Pittsburgh; William E. Wagner, Elizabeth, both of Pa.

[73] Assignee: Midland-Ross Corporation, Cleveland, Ohio

[21] Appl. No.: 741,728

[22] Filed: Nov. 15, 1976

[51] Int. Cl.² ............................................. H02G 3/12
[52] U.S. Cl. ..................................... 220/3.8; 220/3.94
[58] Field of Search ................................. 220/3.3–3.8, 220/3.92, 3.94, DIG. 25

[56] References Cited
U.S. PATENT DOCUMENTS

| | | | |
|---|---|---|---|
| 1,471,340 | 10/1923 | Knight | 220/3.94 |
| 2,272,944 | 2/1942 | Hiltz | 220/3.7 |
| 2,881,940 | 4/1959 | Hamilton | 220/3.8 X |
| 2,987,211 | 6/1961 | Rudolph | 220/3.4 |
| 3,281,005 | 10/1966 | Schumacher | 220/3.8 |
| 3,877,601 | 4/1975 | Evans et al. | 220/3.3 |

Primary Examiner—Stephen Marcus
Attorney, Agent, or Firm—H. Duane Switzer

[57] ABSTRACT

A tile wall cover for electrical outlet boxes includes a ringlike flat plate having a large central opening therethrough. A ringlike extension is secured to the plate around the opening. The extension is formed from a pair of substantially identical generally U-shaped members each having a base and opposite first and second legs. The first leg on each member has an offset terminal end portion which is offset toward the second leg a distance generally equal to the thickness of the material from which the member is made to form a rabbet on the outer surface of the first leg. The pair of members are reversely positioned with the rabbet on the first leg of each member receiving the terminal end portion of the second leg on the other member.

6 Claims, 2 Drawing Figures

TILE WALL COVER

BACKGROUND OF THE INVENTION

This application pertains to the art of electrical hardware and, more particularly, to tile wall covers for extensions for electrical outlet boxes. Although the invention is particularly applicable to tile wall covers, it will be appreciated that the invention can also be used for extensions in general.

Tile wall covers commonly include a ringlike flat plate having a large opening therethrough and an extension secured to the plate around the opening. The extension is commonly cast of steel or aluminum in order to provide straight sides and corners which are desirable for positioning tile facing closely against the sides of the extension. Electrical switches or outlets are mounted to mounting flanges on the extension. These extensions come in various lengths and sizes, and separate dies are required for casting the different sizes. Metal extensions formed from a plurality of individual steel pieces welded to one another and to a flat plate have been used but they have included more than two different shapes which must be held and welded to form the extension. Certain arrangements of this type have included overlapping portions on the sides of the extension which form a step making it impossible to position a tile closely against the extension.

SUMMARY OF THE INVENTION

A ringlike extension for electrical outlet boxes includes a pair of cooperating substantially identical generally U-shaped members each including a base having spaced-apart first and second legs extending therefrom. The first leg has an offset terminal end portion which is offset toward the second leg at a distance generally the same as the thickness of the material from which the member is made to define a rabbet on the outer surface of the first leg. The pair of members are reversely positioned with the terminal end portion of the second leg on each member received in the rabbet on the first leg of the other member. The extension is preferably provided for a tile wall cover which includes a flat plate having a large central opening therethrough, and the extension is welded to the plate around the opening. The flat plate has mounting means adjacent its outer periphery and outwardly of the extension for mounting same to an electrical outlet box.

The improved extension constructed in accordance with the present application can be made in different sizes in the same stamping dies. The cooperating pair of members which form the extension can be welded together in the area of the rabbets and this is particularly desirable for relatively long extensions.

In one arrangement, one of the legs on each member forming the extension is larger than the outer leg. More particularly, the first leg having the offset terminal end portion is longer than the other leg by a length substantially equal to the length of the offset terminal end portion.

It is a principal object of the present invention to provide an improved ringlike extension for electrical outlet boxes.

It is a further object of the invention to provide an improved tile wall cover for electrical outlet boxes.

It is also an object of the invention to provide an extension or tile wall cover wherein the extension is formed from a pair of identical generally U-shaped members.

It is an additional object of the invention to form an extension from a pair of identical members, and wherein the extension has substantially flat outer sides.

DESCRIPTION OF A PREFERRED EMBODIMENT

Figure 1:
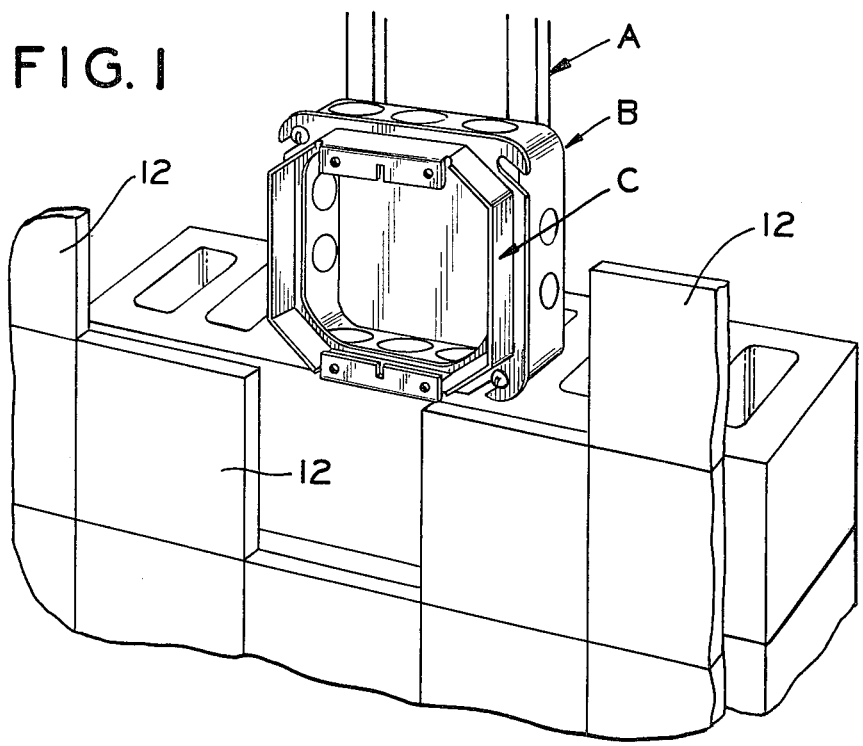
FIG. 1 is a partial perspective illustration of a wall including an electrical outlet box having the tile wall cover of the present application attached thereto.

With reference to the drawing, FIG. 1 shows a building wall A of any suitable conventional construction having a metal electrical outlet box B secured therein in a conventional manner. Obviously, wires extend through wall A to outlet box B. Wall A is adapted to be faced with wall tile indicated generally at 12. In order to properly locate a switch or electrical outlet at the outer surface of tiles 12, a tile wall cover C is secured to outlet box B. Tile wall cover C may also be considered an extension or adapter which extends outlet box B close to the outer surface of tiles 12 and converts same for mounting a switch or electrical outlet. The outer edge of tile wall cover C is normally located slightly beneath the outer surface of tiles 12. The sides of the extension portion of tile wall cover C are substantially plane and straight so that tile 12 will readily abut such sides.

Tile wall cover C includes a ringlike flat metal plate 16 having an outer periphery 18 and a large opening 20 therethrough. Mounting means is integrally formed in flat plate 16 adjacent the outer periphery thereof, and in the arrangement shown mounting means takes the form of diagonal slots 22 located generally adjacent the corners of plate 16 for receiving screws 24 threaded into tapped holes in cover mounting ears on outlet box B. In the arrangement shown, flat plate 16 is square with rounded corners.

A ringlike extension is secured to plate 16 around opening 20 and is formed from a pair of identical generally U-shaped members E. Each member E includes a base 30 having spaced-apart opposite first and second legs 32 and 34 extending outwardly therefrom. In the arrangement shown, each leg 32 and 34 extends outwardly from base 30 at approximately a 45 degree angle and then extends outwardly perpendicular to base 30. However, it will be appreciated that each leg 32 and 34 can be completely straight along its entire length from base 30, or can be curved or take other shapes. In other words, the shape shown for the extension is generally octagonal and it will be appreciated that rectangular or rounded shapes could also be used.

Each leg 32 has an offset terminal end portion 38 which is offset inwardly toward second leg 34 by a distance approximately equal to the thickness of the material from which each member E is formed. This provides a rabbet 40 on the outer surface of each leg 32 adjacent the terminal end thereof.

In the preferred arrangement, one of legs 32 or 34 is longer than the other, and in the particular arrangement shown, each leg 32 is longer than leg 34 by a length generally equal to the length of offset terminal end portion 38. Each base 30 has a mounting flange 44 bent inwardly therefrom adjacent the outer edge of the extension to lie substantially parallel to plate 16 in overlying relationship to opening 20. Mounting flanges 44 are adapted to mount electrical switches or outlets in a known manner.

Figure 2:
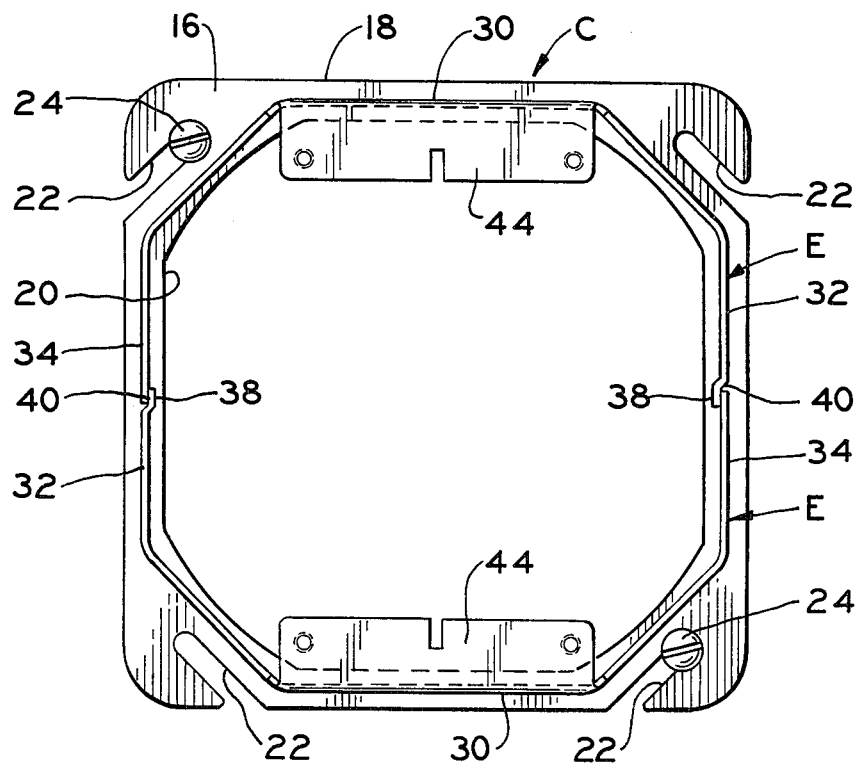
FIG. 2 is a front elevational view of the tile wall cover of the present invention.

The pair of members E are reversely positioned as shown in FIG. 2 with the terminal end portion of each leg 34 received in rabbet 40 on leg 32 of the other member E.

The extension defined by cooperating members E is welded to plate 16 by conventional techniques. The extension is held in a fixture on plate 16 while welding takes place. Projection welding has been used with embossed projections formed in plate 16 at spaced locations around opening 20. The extension is positioned on the projections and properly held thereagainst under pressure while high current is passed through the parts to create a weld at the projections. Legs 32 and 34 on the pair of members may be welded together in the area of rabbets 40, and this is particularly true where the extension is quite long. Extensions commonly extend outwardly from plate 16 anywhere between one-half and two inches. For the longer extensions, welding in the area of rabbets 40 is desired to maintain the outer surfaces of legs 32 and 34 generally in the same plane or along the same line so they are flat and a tile can be butted thereagainst.

Although offset terminal end portions 38 preferably extend the full width or depth of the extension, it will be recognized that it is possible to have these offset portions in the form of relatively smaller tabs or projections which do not extend the full width of the extension. In the assembled extension, mounting flanges 44 are located opposite one another and extend toward one another inwardly of the extension for mounting an electrical device such as a switch or outlet.

Each member E is formed from flat metal stock in a pair of stamping dies having the desired U-shaped configuration. The dies have a width at least as great as the maximum width of an extension desired. For example, where it is known that the maximum extension will be two inches, the dies can have a width slightly in excess of two inches. It is then possible to use the same dies for making extensions of any width from one-fourth inch up to two inches. Flat metal stock of the desired width is simply positioned between the dies and clamped while the dies are closed to form the flat stock to the shape shown in FIG. 2. The resulting extension formed by a given pair of members will be the same as the width of the flat metal stock used in forming each member E.

In actual practice, it will be recognized that legs 32 and 34 may be slightly inclined at angles and the outer surfaces of legs 32 and 34 may not lie perfectly in the same plane. However, the surfaces and corners will be sufficiently straight and properly located for optimum use of the device as a tile wall cover.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. In a tile wall cover for electrical outlet boxes including a substantially flat plate having mounting means adjacent the outer periphery thereof for mounting same to an electrical outlet box and having a large opening therethrough inwardly of said mounting means, and a ringlike extension welded to said plate in surrounding relationship to said opening, the improvement comprising; said extension being formed from a pair of substantially identical generally U-shaped members each having a base and opposite first and second legs, said first leg on each said member having an offset terminal end portion offset toward said second leg a distance generally equal to the thickness of the material from which said member is made to form a rabbet on the outer surface of said first leg, said pair of members being reversely positioned with the rabbet on the first leg of each member receiving the terminal end portion of the second leg on the other member.

2. The cover of claim 1 wherein said pair of members are welded together in the area of said rabbets.

3. The cover of claim 1 wherein said offset terminal end portion extends the full width of said member.

4. The cover of claim 1 including a mounting flange extending inwardly from said base on each said member in outwardly spaced parallel relationship to said plate.

5. The cover of claim 1 wherein one of said legs on each said member is larger than the other leg.

6. The cover of claim 1 wherein said first leg is longer than said second leg by a length generally equal to the length of said offset terminal end portion.

* * * * *